United States Patent [19]
Strohm et al.

[11] Patent Number: 5,228,991
[45] Date of Patent: Jul. 20, 1993

[54] MEMBRANE FILTER MODULE FOR FILTERING FLUIDS IN A CROSS-FLOW

[75] Inventors: Gerhard Strohm, Oestrich-Winkel; Wilfried Kaul, Weinsheim; Georg Schnieder, Traisen, all of Fed. Rep. of Germany

[73] Assignee: Seitz-Filter-Werke GmbH und Co., Bad Kreuznach, Fed. Rep. of Germany

[21] Appl. No.: 795,460

[22] Filed: Nov. 20, 1991

[30] Foreign Application Priority Data
Nov. 20, 1990 [DE] Fed. Rep. of Germany ....... 4036978

[51] Int. Cl.$^5$ ............................................. B01D 63/02
[52] U.S. Cl. ............................ 210/321.8; 210/321.89; 210/500.23
[58] Field of Search ............... 55/16, 158; 210/321.19, 210/321.78–321.81, 321.87–321.89, 500.23

[56] References Cited
U.S. PATENT DOCUMENTS
3,698,559 10/1972 Manjikian ..................... 210/321.9
4,237,596 12/1980 Hughes et al. ..................... 55/158

FOREIGN PATENT DOCUMENTS
2646358 4/1978 Fed. Rep. of Germany .
3916511 5/1989 Fed. Rep. of Germany .
8801895 3/1988 World Int. Prop. O. .

Primary Examiner—Frank Sever
Attorney, Agent, or Firm—Robert W. Becker & Associates

[57] ABSTRACT

In known membrane filter modules the sealing of the inlet of the faces of the capillary or hollow fiber membranes relative to the inlet of the stainless steel filter housing suffers from loosening of the sealing compound from the housing and from ruptures within the sealing compound due to different extension coefficients of the materials employed. With the inventive membrane filter module the safe employment of stainless steel filter housings with sealings and fluid distributing heads made of plastic is possible. At least a portion of the outer mantle surface of the end of the membrane bundle which is enclosed by a sealing compound or fused with plastic material is exposed so that the exposed outer mantle surface of the end of the membrane bundle may cooperate with sealing elements. Due to the fact that the sealing no longer acts on the stainless steel housing a simple and safe combination of the membrane filter module with the fluid distributing heads made of plastic is achieved.

21 Claims, 4 Drawing Sheets

MEMBRANE FILTER MODULE FOR FILTERING FLUIDS IN A CROSS-FLOW

BACKGROUND OF THE INVENTION

The present invention relates to a membrane filter module for filtering fluids in a cross-flow in cooperation with fluid distributing heads, whereby the membrane filter module has a tubular housing and membranes in the form of a bundle disposed inside the housing. The membrane are selected from the groups consisting of tubular membranes, capillary membranes and hollow fiber membranes. The housing at both ends thereof has a first central inlet for receiving a respective end of the bundle, whereby the membranes in the end of the bundle are fixedly connected to one another, and a second inlet that, within an outer collar provided at the ends of the housing, extends in an axial direction along the end of the bundle in a sealed fashion into the interior of the housing in which the bundle is disposed.

A membrane filter module of the aforementioned kind is, for example, known from DE-PS 39 16 511.6. The membrane filter module described therein contains a bundle comprised of capillary, respectively, hollow fiber membranes and discloses an arrangement of all of the inlets to the capillary, respectively, hollow fiber membranes and to the interior of the housing at both end faces of the housing.

For the embodiment of separated inlets for the filtrate, respectively, the fluid to be filtered at either end-face of the housing, the membrane filter module is provided with an inner collar which encloses a central inlet and has an outer inlet which allows access to the interior of the filter housing. The two ends of the membrane bundle are held within the two inner collars at the end faces of the filter housing and are enclosed by an elastic sealing compound or are fused in a sealed manner with a plastic material. At either end face of the filter housing the free space between the inner collar and an outer collar formed by the housing wall connects to the outside of the capillary, respectively, hollow fiber membranes.

The inner collar protrudes axially relative to the end face of the outer collar to such an extent that at least an annular sealing positioned on the outer mantle surface of the inner collar is exposed. The sealing, in cooperation with a fluid distributing head, seals the central inlet of the faces of the capillary, respectively, hollow fiber membranes relative to the outer inlet of the filter housing.

When the filter housing is made from stainless steel such a sealing arrangement, due to the varying expansion coefficients of the stainless steel housing, especially of the inner collar which receives the end of the membrane bundle, and of the ends of the bundle which are enclosed in an elastically deformable sealing compound or fused with a plastic material, may, already after the first use, show ruptures within the sealing compound or the sealing may come loose from its position at the inner collar. This results in the membrane filter module showing leaks and thus being unsuitable for further filtrations.

It is therefore an object of the present invention to solve the problem of leakage for a membrane filter module within the area of the sealing compound.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
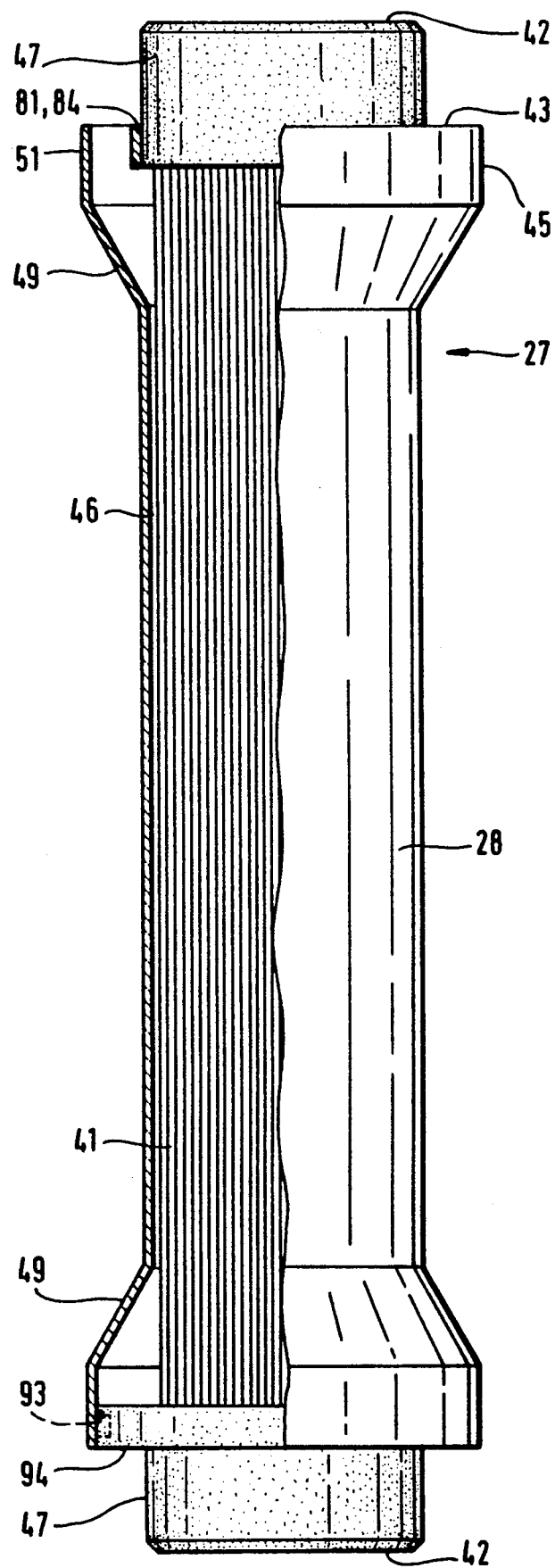
FIG. 1 shows a part-sectional view of a preferred embodiment of the inventive filter module.
Figure 2:
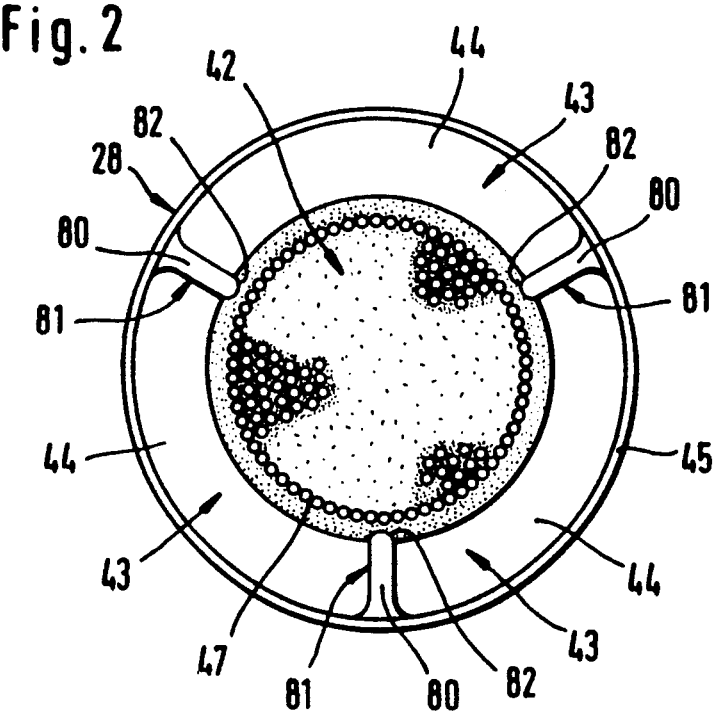
FIG. 2 is an end view of an inventive embodiment of the membrane filter module.

The membrane filter module of the present invention is primarily characterized by at least a portion of an outer mantle surface of the end of the bundle being exposed for cooperating with a sealing means provided between the membrane filter module and the fluid distributing head. Preferably the outer mantle surface extends axially beyond the housing for cooperating with the sealing means. The membranes within the end of the bundle are fixedly connected to one another by a sealing compound or by fusing the membranes with a plastic material. Because the ends of the bundles of the capillary, respectively, hollow fiber membranes extend past the first central inlet of the filter housing, the protruding outer mantle surface of the end of the bundle may serve directly for sealing the first central inlet. For this purpose, at least a portion of the outer mantle surface of the end of the bundle is exposed or extends past the first central inlet of the filter housing at least to such an extent in the axial direction that at least a sealing means which may be comprised of a plurality of components may engage the end of the bundle. It is also possible that a plurality of sealing means, for example, a plurality of O-rings made of a suitable material which is inert towards the fluids to be filtered engage the outer mantle surface of the end of the bundles. Due to the fact that the engagement of the sealing means is displaced from the inner metal collar of the filter housing (arrangement according to the prior art) to the sealing compound respectively the fused membranes of the end of the bundle, the end of the bundle no longer needs to be fused or welded to the inner collar since an inner collar is no longer required. Furthermore, it is now possible to combine the advantages of the stainless steel filter housing, i.e. pressure and heat stability as well as chemical resistance and inertness, with the advantages of the fluid distributing heads which are used in the cross-flow filtration and made of plastic, the advantages being a simple and economical manufacturing process. Since the sealing of the first central inlet of the faces of the capillary. respectively, hollow fiber membranes in connection with a fluid distributing head preferably made of plastic is now solely achieved via elastic plastic parts, the occurrence of leaks in this area is substantially prevented.

The ends of the bundle which are fused with a plastic material or enclosed by the sealing compound may fill out the space within the upper housing portion inside of the collar-like enclosing housing wall in a radially as well as an axially direction. The end of the bundle may be provided with a first annular projection made from the sealing compound and in the case of the complete radial filling of the upper housing portion, the flow connection with the housing interior is achieved by providing at least one fluid channel of any desired shape. This fluid channel is preferably provided in the radially outwardly oriented sections of the end of the bundle which is fused or enclosed by a sealing compound, i.e. in an area where no tubular, capillary, or hollow fiber membranes are present. This means that it expedient that the fluid channel is provided within the annular portion defined by the difference between the radius of the central tube of the housing and the maximum radius of the conically widening outer collar part of the housing. The fluid channel may be provided in any desired shape. Especially suitable are cylindrical funnel-shaped or oval embodiments.

The fluid channel may be formed by providing inside the filter housing a respective mold during the application of the sealing compound, respectively, during the fusing of the membranes within the ends of the bundles, the mold being easily removable after the completion of the fusing, respectively, sealing process so that they leave a respective opening behind. It is also possible to provide a respective hollow body during the application of the sealing compound. Furthermore, it is advantageous to provide the fluid channel in the form of a cutout by simply bore or cut the fluid channel into the hardened sealing compound or the fused material.

In order to achieve a sufficiently great and uniform flow connection along the circumference of the end of the bundle of capillary, respectively, hollow fiber membranes to the interior of the filter housing, it may be advantageous to provide a holding means within the filter housing. The holding means serves at the same time to position the ends of the bundles. Due to the displacement of the sealing means towards the ends of the bundle the inventive holding means must only fix the end sections of the bundle relative to the outer collar of the filter housing in an axial and radial direction and, optionally, provide a centering function This holding means may therefore be designed simpler than respective holding means known for the aforementioned filter modules of the prior art.

In an advantageous embodiment of the membrane filter module the holding means may be comprised of at least two cross-pieces connected to the inner mantle surface of the housing and extending radially inwardly. The cross-pieces are preferably made from stainless steel, as is the filter housing, and are, for example, welded to the filter housing. However, the entire housing may be comprised of any other suitable material, for example, of plastic material, ceramic or a special glass, so that the cross-pieces may also be formed of plastic material or glass etc. and may be provided as an integral part of the filter housing.

In order to avoid rotation of the ends of the bundle within the filter housing the cross-pieces preferably engage respective recesses or grooves within the ends of the bundles. This avoids bending and breaking of the extremely thin individual fibers of the membrane module and thus avoids break-down of the entire filter module.

In general, it is sufficient to provide two or more cross-pieces for the fixation of the bundle, however, in order to increase the stability of the arrangement within the area of the ends of the bundle it may be necessary to enlarge the holding surface of the holding means engaging the ends of the bundle. This may be achieved by increasing the number of cross-pieces or by providing the cross-pieces with holding elements formed in correspondence to a circular arc.

Furthermore, it may be preferable to provide the holding elements with an annular inner collar. For this embodiment, however, it is important that the annular inner collar, in contrast to the inner collar of the prior art, is almost flush with the housing, especially with the upper edge of the outer collar, or is displaced radially inwardly. The width of the annular inner collar may be narrow since it must not receive a sealing. The annular inner collar may also axially extend past the filter housing, whereby, however, in this embodiment again no sealing is provided at the annular inner collar (the holding means). With all such contact surface providing holding elements it is advantageous to provide a securing means against rotation in the form of grooves and recesses which engage respective projections provided at the ends of the bundle that is fused or enclosed in a sealing compound.

These recesses or grooves may be, for example, cut out of the stainless steel material of the holding means. The ends of the bundles are thus positioned due to the cooperation of the recesses or grooves and the respectively engaging projections and are insertable into the filter module in a manner which prevents rotation, so that they are protected against damage.

It is also possible to provide the optionally present annular inner collar or the outer collar of the filter housing with respective projections at their inner mantle surface which engage respective recesses, for example, grooves, provided at the ends of the bundles. In another embodiment it is also possible that the holding means, the annular inner collar, or the outer collar be provided with recesses at their inner mantle surface, for example, axially or radially extending grooves, which may be cut out, and which are engaged by respective projections provided as an integral part of the ends of the bundles. Lasted of providing the respective grooves in a separate working process, it is preferable to manufacture them during the application of the sealing compound, which, for example, may surround the projections.

For all of the inventive membrane filter modules the radial as well as the axial fixation may be improved by further advantageous embodiments of the respective ends of the bundle.

For example, the ends of the bundle may be provided with a second annular projection whereby the second annular projection rests on the holding means. However, this second annular projection may be the only one provided at the bundle, i.e., only one annular projection is provided and rests on the holding means. By providing at least one projection, which is at least partially annular, directly at the end of the bundle the axial position of the entire bundle of capillary, respectively, hollow fiber membranes is essentially fixed even when higher pressures are exerted onto the entire membrane filter module.

A further fixation relative to the axial orientation may be achieved when the end of the bundle is provided with a third annular projection which rests on a side of the holding means facing the interior of the housing. Due to this embodiment the entire bundle and additionally each individual end of the bundle is essentially restricted in its axial movability and is protected against accidental removal from the filter housing. Accordingly, the membrane filter modules are provided with a limited, but sufficient play in order to be axially displaceable relative to the fluid distributing heads for compensating in this manner thermal and mechanical tensions.

DESCRIPTION OF THE PREFERRED EMBODIMENTS

The present invention will now be described in detail with the aid of several specific embodiments utilizing FIGS. 1 through 7.

As can be seen from FIGS. 1 through 5 the inventive membrane filter module 27 is provided with a tubular filter housing 28 in which a bundle of capillary or hollow fiber membranes 41 is disposed. These capillary or hollow fiber membranes 41 are selected with respect to the filtering process to be preformed and may have an inner diameter in the case of the hollow fiber membranes of up to 0.5 mm, in the case of the capillary membranes an inner diameter between 0.5 and approximately 2 mm, and in the case of the tubular membranes an inner diameter greater than 2 mm. The selection of the tubular, capillary, or hollow fiber membranes 41 determines the type of the respective membrane filter module 27 while the filter housing 28, at least in its outer embodiment, is identical for all types of membranes so that an exchange of membranes of different types is possible without problems.

Each end of the filter housing 28 of the membrane filter module 27 is provided with a pair of inlets, a first central inlet 42 which connects to the inner passages of the capillary or hollow fiber membranes 41, and a second annular inlet 43 at the face, which extends between the outer collar 45 of the filter housing 28 and the first central inlet 42 whereby it surrounds the first central inlet 42 and connects with the outside of the capillary or hollow fiber membranes 41 respectively with the interior 46 of the tubular filter housing 28.

The bundle of membranes 41 in the inventive filter module is inserted into the interior 46 of the tubular filter housing 28 and may be inserted to such an extent through an inner holding means 81 (see FIGS. 2-4) that it protrudes from the holding means 81 in an axial direction.

At least the protruding end section of the bundle of tubular, capillary, or hollow fiber membranes 41 is sealed to form a plug-like end by applying an elastic sealing compound or by fusing the ends with a plastic material.

It can be seen from FIGS. 1, respectively, 6, that with the inventive membrane filter module the holding means which is preferably in the form of an annular inner collar 84 (FIG. 4 and FIG. 7) must not extend past the outer collar 45 of the filter since the sealing means or element 89 (see FIG. 6) which is required for the sealing action is supported by a flow distributing head 29 which engages the membrane filter module so that the sealing element engages the protruding end of the bundle 47. However, it is also possible that one or more sealing elements 89 may be supported at the end of the bundle, for example, by respective annular or other projections formed as an integral part of the end of the bundle.

Figure 7:
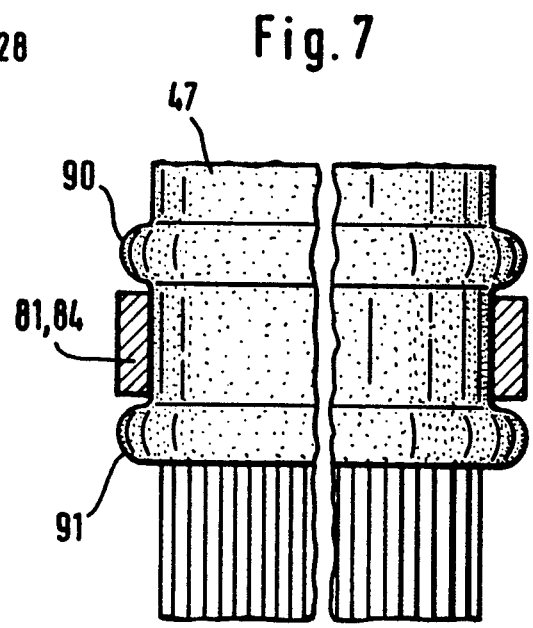
FIG. 7 shows an enlarged cross-sectional view of the end of the membrane bundle of FIG. 6.

It can furthermore be seen especially in FIG. 7 that for stabilizing the axial position of the end of the bundle 47 its outer mantle surface is provided with annular projections 90 respectively 91. Between the two annular projections 90 and 91 a holding means 81, 84 extends in the axial direction so that with this arrangement the end of the bundle is securely held in place while at the same time an axial play is ensured.

From the lower section of FIG. 1 it can be taken that the ends of the bundle 47 which are enclosed by a sealing compound or fused with a plastic material may extend partially or entirely to the inner edge of the housing wall which is provided in the form of a collar, i.e., the sealing compound may come into contact with the outer collar 45. Preferably, an annular projection 94 is integrally formed from the sealing compound at the end of the bundle 47. As indicated in the drawing the housing wall may then be provided with radial projections 93 which extend into the sealing compound, or, not shown recesses which are engaged by the sealing compound.

The FIGS. 2 to 5 represent preferable embodiments of the membrane filter module in an end view.

The holding means 81, in the first embodiment (FIG. 2), comprises cross-pieces 80 which are connected to the wall of the outer collar 45 and extend radially inwardly. They serve as a distance element and engage recesses or grooves 82 which are provided at the end of the bundle 47. It can also be seen that the face of the end of the bundle 47 defines a first central inlet 42, and between the outer mantle surface of the end of the bundle 47 and the inner mantle surface of the outer collar 45 of the filter housing 28 a second inlet 43 is formed. This second inlet 43 surrounds the first central inlet 42 in the form of a plurality of channel portions 44 into which the second inlet 43 is divided by the cross-pieces 80.

Figure 3:
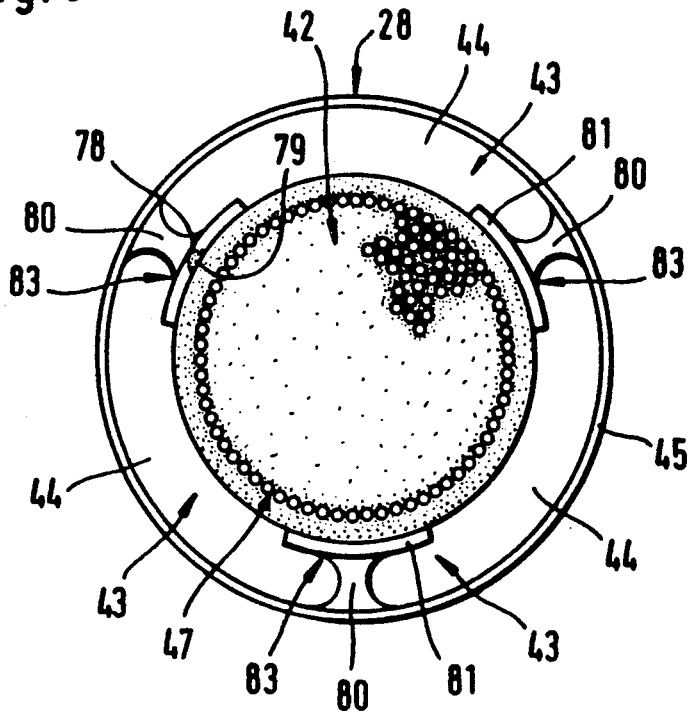
FIG. 3 shows an end view of a further embodiment of the inventive membrane filter module.
Figure 4:
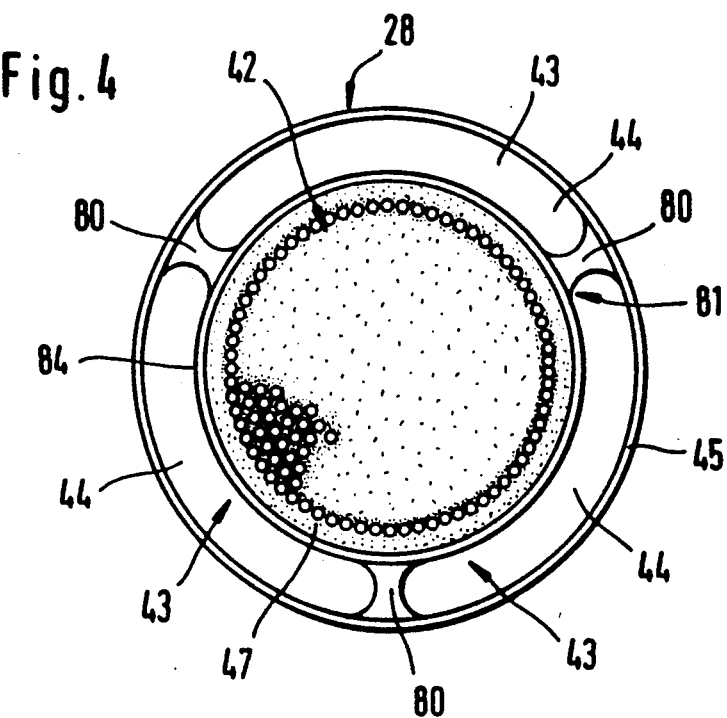
FIG. 4 is an end view of another inventive embodiment of the membrane filter module.

In order to enlarge the engaging or holding surface, respectively, to increase the stability of the arrangement within the face section it is possible, as shown in FIG. 3, to provide the cross-pieces 80 with integral holding elements 83 respectively, as can be seen in FIG. 4, with a continuous annular inner collar 84.

The securement against rotation in such embodiments, as can be seen with the holding element 83 in FIG. 3, may be improved by providing longitudinal recess or grooves 78 at the holding elements 83, respectively, at the annular inner collar 84, as can be seen in FIG. 4, which may extend in an axial direction. These grooves cooperate advantageously with the integral projections 79 provided at the end of the bundle 47.

Figure 5:
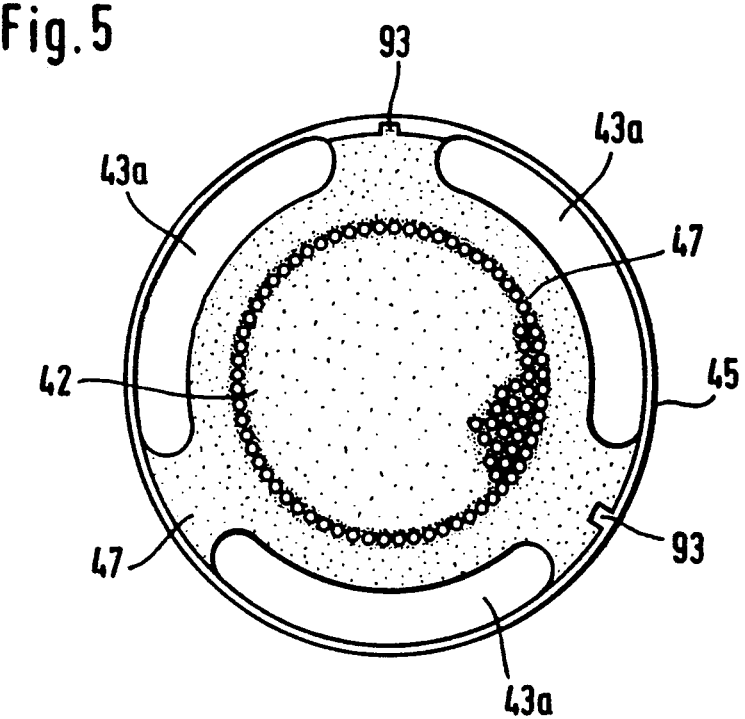
FIG. 5 is an end view of a further inventive embodiment of the membrane filter module.
Figure 6:
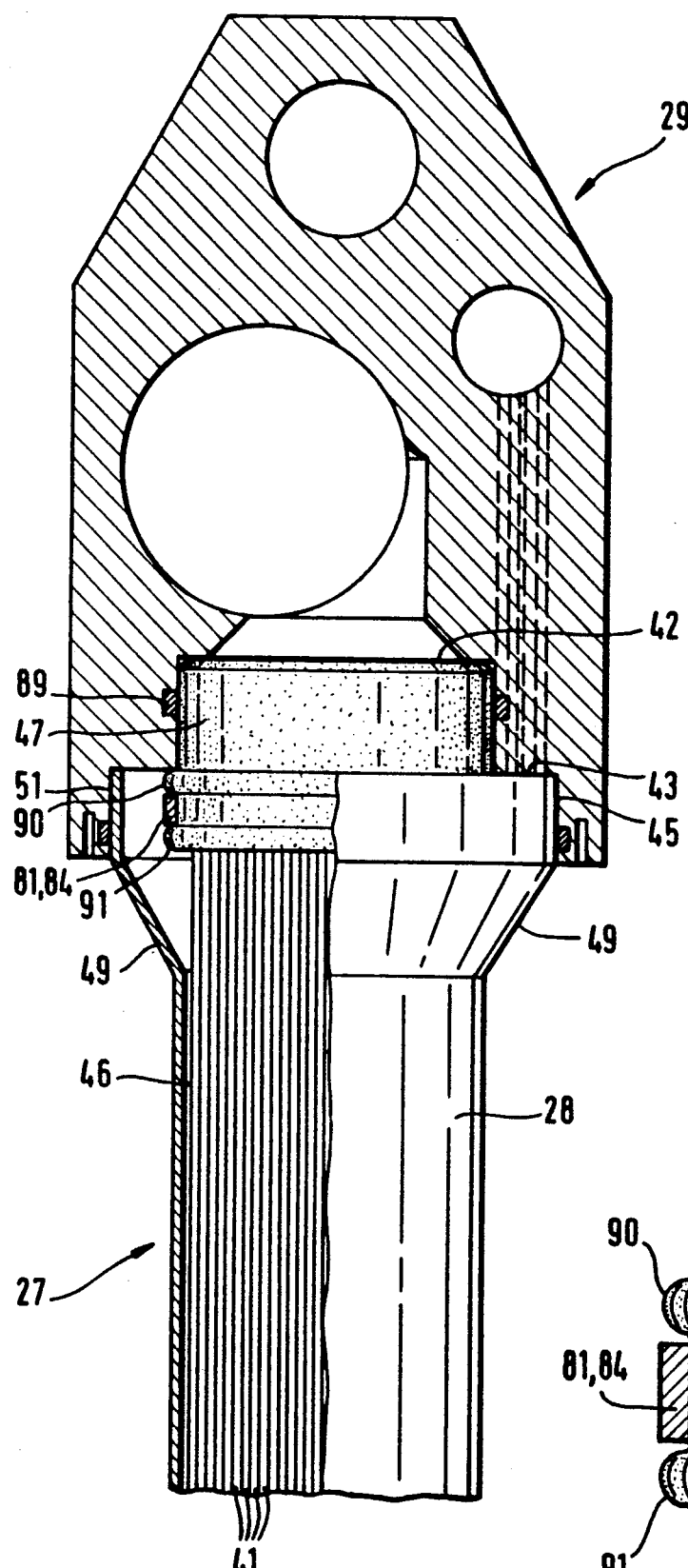
FIG. 6 shows a part-sectional view of one end of the membrane filter module with the filter housing and an engaged fluid distributing head designed for an inner flow path.

It can be seen in FIG. 5 that the sealing compound may extend to the inner mantle surface of the outer collar 45. To improve the positioning and the fixation, the inner mantle surface of the outer collar 45 of the housing may be provided with projections and/or recesses 93 which are in contact with the sealing compound or are entirely enclosed by the sealing compound. With this embodiment a displaceable support with a slight play may be achieved.

The second inlet 43 which is formed between the holding means 81, respectively, the inner collar 84 which receive the end of the bundle and the outer collar 45 (see FIG. 1) protrudes radially relative to the interior 46 of the tubular filter housing 28 and is guided by the conical wall 49 into the interior 46 of the filter housing 28. Accordingly, between the inlet 43 and the interior 46 of the filter housing 28 an essentially annular free space is provided which is divided into channel portions by the holding elements 80, 81. The outer collar 45 is provided with a cylindrical outer mantle surface 51 which cooperates with an annular seal 52 or plurality a of such annular seals provided at a flow distributing head 29 that engages the filter module (see FIG. 6).

As can be seen in FIG. 5, this embodiment is provided with fluid channels 43a. These fluid channels 43a correspond in their function essentially to the channel portions 44 of the second inlet 43, however, they are provided when the sealing compound extends essentially to the edge of the outer collar 45 of the filter housing 28.

The inventive membrane filter module in all of its embodiments provides an advantageous employment of fluid distributing heads in a membrane filter apparatus for treating fluids, for example, wine.

The present invention is, of course, in no way restricted to the specific disclosure of the specification and drawings, but also encompasses any modifications within the scope of the appended claims.

What we claim is:

1. A membrane filter module for filtering fluids in a cross-flow in cooperation with fluid distributing heads, said membrane filter module having a tubular filter housing and membranes in the form of a bundle disposed inside said filter housing, said membranes being selected from the group consisting of tubular membranes, capillary membranes and hollow fiber membranes, said filter housing at both ends thereof having a first central inlet for receiving a respective end of said bundle, with said membranes in said end of said bundle being fixedly connected to one another, and a second inlet that, within an outer collar provided at said ends of said filter housing, extends in an axial direction along said end of said bundle in a sealed fashion into an interior of said filter housing in which said bundle is disposed, said membrane filter module comprising:

means for enabling the sealing of two independent fluid flows of an exchangeable distributing head relative to one another, including: at least a portion of an outer mantle surface of said end of said bundle being exposed for cooperating with a sealing means provided between said membrane filter module and the fluid distributing head.

2. A membrane filter module according to claim 1, wherein said outer mantle surface axially extends beyond said filter housing for cooperating with the sealing means.

3. A membrane filter module according to claim 1, wherein said end of said bundle is provided with a first annular projection made from a sealing compound, and wherein a fluid channel connects said interior to a face of said filter housing.

4. A membrane filter module according to claim 3, wherein said membranes within said end of said bundle are fixedly connected to one another by a sealing compound.

5. A membrane filter module according to claim 4, wherein said fluid channel is generated by a respective mold during application of said sealing compound.

6. A membrane filter module according to claim 4, wherein said fluid channel is in the form of a respective cutout provided after application of said sealing compound.

7. A membrane filter module according to claim 3, wherein said membranes within said end of said bundle are fixedly connected to one another by fusing said membranes.

8. A membrane filter module according to claim 7, wherein said fluid channel is generated by a respective mold during fusing.

9. A membrane filter module according to claim 7, wherein said fluid channel is in the form of a respective cutout provided after fusing said membranes.

10. A membrane filter module according to claim 3, wherein a holding means is provided within said filter housing, said holding means being comprised of at least two cross-pieces connected to an inner mantle surface of said filter housing and extending radially inwardly.

11. A membrane filter module according to claim 10, wherein said cross-pieces engage said end of said bundle.

12. A membrane filter module according to claim 10, wherein said cross-pieces have holding elements that correspond to the form of a circular arc.

13. A membrane filter module according to claim 12, wherein an annular inner collar is connected to said holding elements.

14. A membrane filter module according to claim 13, wherein said annular inner collar, on a radially inwardly facing surface thereof, has projections for engaging said end of said bundle.

15. A membrane filter module according to claim 13, wherein said annular inner collar, on a radially inwardly facing surface thereof, has recesses for engaging said end of said bundle.

16. A membrane filter module according to claim 13, wherein a second annular projection is provided at said end of said bundle, said second annular projection resting on said annular inner collar.

17. A membrane filter module according to claim 10, wherein a second annular projection is provided at said end of said bundle, said second annular projection resting on said holding means.

18. A membrane filter module according to claim 17, wherein said end of said bundle is provided with a third annular projection that rests on a side of said holding means facing said interior of said filter housing.

19. A membrane filter module according to claim 3, wherein a second annular projection is provided at said end of said bundle, said second annular projection resting on said outer collar.

20. A membrane filter module according to claim 1, wherein said outer collar, on a radially inwardly facing surface thereof, has projections for engaging said end of said bundle.

21. A membrane filter module according to claim 1, wherein said outer collar, on a radially inwardly facing surface thereof, has recesses for engaging said end of said bundle.

* * * * *